United States Patent [19]

Su et al.

[11] Patent Number: 5,250,638
[45] Date of Patent: Oct. 5, 1993

[54] EPOXY RESIN CURATIVES AND METHOD USING LACTONE-IMIDAZOLE COMPLEXES

[75] Inventors: Wei-Yang Su; Harold G. Waddill, both of Austin, Tex.

[73] Assignee: Texaco Chemical Company, White Plains, N.Y.

[21] Appl. No.: 955,376

[22] Filed: Oct. 1, 1992

Related U.S. Application Data

[63] Continuation-in-part of Ser. No. 736,842, Jul. 29, 1991, abandoned.

[51] Int. Cl.$^5$ .................. C08G 59/68; C08G 65/10; C08G 63/82
[52] U.S. Cl. ...................... 525/504; 525/529; 525/533; 528/94; 528/116; 528/354; 528/355
[58] Field of Search ............ 528/94, 116, 354, 355; 525/529, 533, 504

[56] References Cited

U.S. PATENT DOCUMENTS

| | | | |
|---|---|---|---|
| 3,222,312 | 12/1965 | Wyart et al. | 528/116 |
| 3,294,743 | 12/1966 | Mack | 528/116 |
| 3,489,695 | 1/1970 | Green | 528/117 |
| 4,931,528 | 6/1990 | Waddill et al. | 528/94 |

Primary Examiner—Frederick F. Krass
Attorney, Agent, or Firm—James L. Bailey; Kenneth R. Priem; Richard A. Morgan

[57] ABSTRACT

An epoxy resin composition comprises the cured reaction product of an epoxy resin and a lactone-imidazole complex. For example, complexes of butyrolactone and caprolactone with 1-isopropyl-2-methyl imidazole were formed wherein the mole ratio of lactone:imidazole ranged from 1:1 to 2:1. The complexes are less reactive than the imidazole alone, giving them an extended pot life. The compositions are useful for making filament windings where an extended working time is required. Other applications include those in which it would be impractical to use the more reactive unmodified imidazole as the sole curing agent.

6 Claims, No Drawings

EPOXY RESIN CURATIVES AND METHOD USING LACTONE-IMIDAZOLE COMPLEXES

CROSS-REFERENCE TO RELATED APPLICATION

This application is a continuation-in-part of Ser. No. 07/736,842 filed Jul. 29, 1991, for Epoxy Resin Curative And Method to W. Su and H. G. Waddill, now abandoned.

BACKGROUND OF THE INVENTION

1. Field of the Invention

The invention relates to an improved method for curing epoxy resins and the resin product thus produced. The invention also relates to an epoxy resin and curative composition.

2. Description of Related Art

Epoxy resins constitute a broad class of polymeric materials having a wide range of physical properties. The resins are characterized by epoxide groups, which are cured by reaction with curing agents to provide cured epoxy resin compositions with various desirable properties. The most common epoxy resins are condensation products of epichlorohydrin and Bisphenol A.

Substituted imidazoles have been used as curing agents for epoxy resins. U.S. Pat. No. 4,931,528 to H. G. Waddill et al. discloses 1-isopropyl-2-methyl imidazole as an epoxy resin curative.

This patent teaches the desirability of making cured products from a substituted imidazole. The need for extending the working time of these compositions has become apparent in order to utilize the desirable properties of the imidazole curative for applications such as filament winding.

SUMMARY OF THE INVENTION

The invention comprises an epoxy resin composition comprising of epoxy resin and an effective curing amount of a curing agent. The curing agent comprises a lactone-imidazole complex. This complex is formed by mixing a selected lactone and a selected imidazole in a mole proportion of 1:5 to 5:1.

These compositions exhibit extended pot life (working time) over the imidazole used alone as a curing agent. This extended pot life makes the composition useful for applications such as filament windings.

DESCRIPTION OF THE PREFERRED EMBODIMENTS

The imidazole component of curative composition is 1,2-substituted or 1-substituted imidazole. The synthesis of these compounds is taught by U.S. Pat. No. 4,927,942 to G. P. Speranza et al. and in U.S. Pat. No. 4,921,969 to W. Su et al. both incorporated herein by reference in their entirety. These patent references teach that an imidazole is prepared by reacting a diamine with an organic acid to form an amide. For example, N-isopropylethylene diamine is reacted with acetic acid to form 1-isopropyl-2-methyl imidazoline. The amide containing reaction mixture is catalytically dehydrogenated to obtain the imidazole. The reaction mixture is then vacuum distilled to recover the imidazole product.

According to this method, a series of imidazoles were synthesized and identified, including:
1-isopropyl-2-methyl imidazole,
1-isopropyl-2-phenyl imidazole,
1-isopropyl-2-tolyl imidazole,
1,2-dimethyl imidazole, and
1-methyl imidazole.

The synthesis of lactones is well-known in the art. For example, U.S. Pat. Nos. 2,301,827 and 3,155,686 teach the preparation of lactones and are both incorporated herein by reference. In general, a lactone is an inner ester of a carboxylic acid. In a molecule comprising an aliphatic chain with carboxyl and hydroxy substitutes separated by 2 to 5 or more carbon atoms, a proton donor catalyzes the formation of the cyclic anhydride with the elimination of water. The reaction is generally represented as follows:

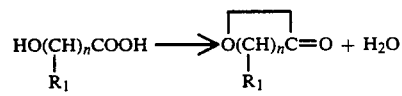

wherein n ranges from 2 to 5 or more and $R_1$ is a hydrogen or alkyl radical of 1 to 18 carbon atoms or mixture thereof.

Suitable proton donors used include concentrated mineral acid such as sulfonic acid, perchloric acid and solid acid catalysts such as sulfonic acid ion exchange resins including sulfonic acid ion exchange resins. Organic acids such as p-toluene sulfonic acid hydrate have been used, as well as electron acceptors such as boron trifluoride and boron trifluoride etherate. The proton donor is provided in an amount to provide 1 to 2 moles of protons or electron acceptors per mole of carboxylic acid.

The lactonization reaction is carried out at a temperature of about 100° C. while removing water to maintain the reaction mixture essentially anhydrous. The reaction is continued under those conditions for sufficient time to effect the conversion of a substantial portion of reactant to lactone. It is convenient to follow the progression of the reaction by withdrawing samples during the reaction and subjecting them to infrared analysis. For example, the formation of 5 and 6 member ring lactone reaction products is shown by infrared analysis of the 5.66 and 5.78 micron regions. Thus, by utilizing the infrared analysis or correlated reaction times, the length of time to achieve the reaction product is determined. This time may range up to 5 hours. Experience has shown that catalyst concentration, and reaction temperature can be varied to produce essentially complete reaction in about 1 hour which is efficient and economic for a laboratory scale preparation.

The reaction mixture is diluted with a non-polar solvent to reduce its viscosity and filtered. The lactone is recovered by vacuum distillation, e.g., 80° C. and 2mm Hg pressure.

According to this method a number of lactones are synthesized including:
beta-butyrolactone,
gamma-butyrolactone,
epsilon-caprolactone,
gamma-caprolactone,
beta-propiolactone,
delta-valerolactone,
gamma-lactone, and
pantolactone.

The lactone:imidazole complex is formed by mixing the lactone with the imidazole in the desired mole ratio, for example, 1:5 to 5:1. The preferred ratio is 1:2 to 3:1, most preferably 1:1 to 2:1. The mixing is conducted at room temperature with the spontaneous formation of the complex. For example, the lactone and imidazole are mixed with a mechanical mixer in a stainless steel resin pot at 20° C. to 25° C. (68° F. to 77° F.) for one-half to one minute.

In forming an epoxy resin product the lactone-imidazole complex curing agent is admixed in an effective curing amount with an epoxy resin. This can be accomplished by adding the epoxy resin to the curing agent in the same resin pot in which the lactone-imidazole complex was synthesized. The components are mixed by stirring until a homogeneous admixture is formed. This lactone-imidazole admixture has a slower reaction time than the imidazole-epoxy resin admixture. The pot life is therefore useful in applications which require an extended pot life, such as filament winding.

The curative agent is added to the formulation in an amount that achieves desired properties. The proper amount of curative to provide best properties is usually determined by the preparation of a number of samples which are tested to determine the composition with the most desirable physical characteristics. Typically, the physical property maximized is either the glass transition point (Tg) according to ASTM D-3418 or the heat deflection temperature (HDT) according to ASTM D-648.

Curing may be accomplished at ambient conditions. For development of optimum achievable properties, however, curing at elevated temperature may be necessary. The curing temperature range acceptable in this invention is from about 60° C. to about 250° C. for about 1 to 36 hours.

The preferred epoxy base resin is a vicinal polyepoxide containing compound. Generally the vicinal polyepoxide containing compounds which are amine cured are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like. These vicinal polyepoxide containing compounds typically are of an epoxy equivalent weight of 150 to 250. Preferably the base resin, which has an epoxide equivalent weight of from 175 to 195, is derived from condensing epichlorohydrin with 2,2-bis(p-hydroxyphenyl propane) to form 2,2-bis[(p-2,3 epoxy propoxy)phenyl] propane, a derivative of bisphenol A.

Preferred polyepoxides are those of glycidyl ethers prepared by epoxidizing the corresponding allyl ethers or reacting, by known procedures, a molar excess of epichlorohydrin and an aromatic polyhydroxy compound, i.e., isopropylidene bisphenol, novolac, resorcinol, derivatives or aromatic amines, etc. The epoxy derivatives of methylene or isopropylidene bisphenols are especially preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4,-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like.

Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis-(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

EXAMPLE 1

Lactone-imidazole complexes were prepared by mixing the imidazole with the lactone at room temperature. The imidazoles used were a follows:

| | |
|---|---|
| 1-isopropyl-2-methyl imidazole | (IPMI) |
| 1-isopropyl-2-phenyl imidazole | (IPPI) |
| 1-isopropyl-2 o-tolyl imidazole | (IPTI) |
| 1,2-dimethyl imidazole | (DMI) |
| 1-methyl imidazole | (MI) |

The complexes prepared are listed here:

| lactone | imidazole | mole ratio lactone:imidazole |
|---|---|---|
| a. beta-butyrolactone | IPMI | 1:1 |
| b. gamma-butyrolactone | IPMI | 1:1 |
| c. beta-butyrolactone | IPMI | 2:1 |
| d. gamma-butyrolactone | IPMI | 2:1 |
| e. epsilon-caprolactone | IPMI | 1:1 |
| f. gamma-caprolactone | IPMI | 1:1 |
| g. epsilon-caprolactone | IPMI | 2:1 |
| h. gamma-butyrolactone | IPPI | 1:1 |
| i. epsilon-caprolactone | IPPI | 1:1 |
| j. gamma-butyrolactone | IPPI | 1:1 |
| k. epsilon-caprolactone | IPPI | 1:1 |

-continued

| lactone | imidazole | mole ratio lactone:imidazole |
|---|---|---|
| l. epsilon-caprolactone | DMI | 1:1 |
| m. epsilon-caprolactone | MI | 1:1 |

The beta-butyrolactone/1-isopropyl-2-methyl imidazole complex was confirmed by $C^{13}$ NMR spectroscopy. The results were consistent with a complex formed between the carbonyl carbon of beta-butyrolactone and the one pair of electrons of 1-isopropyl-2-methyl imidazole.

These lactone-imidazole complexes were reacted with a liquid epoxy resin of 185 to 192 equivalent epoxy weight (EEW).

EXAMPLE 2

Reactivity of 1-isopropyl-2-methyl imidazole - lactone complexes with epoxy resin Each of the IPMI lactone complexes were less reactive toward an epoxy resin than was IPMI alone. Viscosity increase was slowed with the lactone complexes thus extending functional working temperature for these formulations. Gel times at a low temperature (80° C.), a temperature to low for complete curing of these formulations, were also longer for the systems cured with the lactone complexes. However, at higher temperatures (120° C. and 150° C.), reaction with the complexes was rapid and much like that of the IPMI curing reactions. Thus, use of the lactone complexes results in a more stable curing system at normal ambient temperatures but allows rapid curing at temperatures required to achieve complete reaction.

EXAMPLE 3

Properties of epoxy resins cured with 1-isopropyl-2-methyl imidazole - lactone complexes

|  | 6501-65D | 6713-1B | 6713-11C | 6713-2A | 6713-12B | 6713-14B | 6713-20D |
|---|---|---|---|---|---|---|---|
| Formulation - parts by weight |  |  |  |  |  |  |  |
| Liquid epoxy resin (EEW 185-192) | 100 | 100 | 100 | 100 | 100 | 100 | 100 |
| 1-Isopropyl-2-methylimidazole (IPMI) | 2 | — | — | — | — | — | — |
| IPMI-beta-Butyrolactone Complex |  |  |  |  |  |  |  |
| 1:1 molar | — | 3 | — | — | — | — | — |
| 1:2 molar | — | — | 3 | — | — | — | — |
| IPMI-gamma-Butyrolactone Complex |  |  |  |  |  |  |  |
| 1:1 molar | — | — | — | 2 | — | — | — |
| 1:2 molar | — | — | — | — | 2 | — | — |
| IPMI-epsilon-Caprolactone Complex |  |  |  |  |  |  |  |
| 1:1 molar | — | — | — | — | — | 2 | — |
| 1:2 molar | — | — | — | — | — | — | 4 |
| Reactivity |  |  |  |  |  |  |  |
| Time to double viscosity (centipoise) @ 23° C., hrs. | ~16 | ~28 | ~32 | ~24 | ~28 | ~22 | ~20 |
| Gel time, mins. @ 80° C. | 38.5 | 48.5 | 78.3 | 84.6 | 69.8 | 68.7 | 46.7 |
| (100 g. mass) 120° C. | 14.0 | 12.6 | 16.0 | 15.0 | 15.6 | 19.4 | 14.7 |
| 150° C. | 8.0 | 7.4 | 8.8 | 10.6 | 8.5 | 20.3 | 8.82 |

| Formulation - parts by weight | 6501-65D | 6713-1B | 6713-11C | 6713-2A | 6713-12B | 6713-14B | 6713-20D |
|---|---|---|---|---|---|---|---|
| Liquid epoxy resin (EEW 185-192) | 100 | 100 | 100 | 100 | 100 | 100 | 100 |
| 1-Isopropyl-2-methylimidazole (IPMI) | 2 | — | — | — | — | — | — |
| IPMI-beta-Butyrolactone Complex |  |  |  |  |  |  |  |
| 1:1 molar | — | 3 | — | — | — | — | — |
| 1:2 molar | — | — | 3 | — | — | — | — |
| IPMI-gamma-Butyrolactone Complex |  |  |  |  |  |  |  |
| 1:1 molar | — | — | — | 2 | — | — | — |
| 1:2 molar | — | — | — | — | 2 | — | — |
| IPMI-epsilon-Caprolactone Complex |  |  |  |  |  |  |  |
| 1:1 molar | — | — | — | — | — | 2 | — |
| 1:2 molar | — | — | — | — | — | — | 4 |
| Properties: Cured ⅛-inch Casting cured: 2 hrs 100° C., 4 hrs. 210° C. | 6657-99D | 6713-1B | 6713-11C | 6713-2A | 6713-12B | 6713-14B | 6713-20D |
| Shore D hardness, 0-10 sec. | 88-87 | 90-87 | 91-89 | 88-86 | 90-88 | 94-91 | 93-90 |
| HDT, °C., 284 psi | 195.1 | 188.5 | 182.4 | 241.8 | 162.3 | 160.3 | 172.5 |
| Izod impact strength, ft-lb/in | 0.06 | 0.08 | 0.04 | 0.04 | 0.03 | 0.05 | 0.03 |
| Tensile strength, psi | 2700 | 4800 | 4200 | 3900 | 4000 | 2400 | 2900 |
| Tensile modulus, psi | 415000 | 398000 | 387000 | 430000 | 366000 | 549000 | 521000 |
| Elongation at break, % | 0.7 | 1.5 | 1.2 | 1.0 | 1.1 | 0.6 | 0.8 |
| Flexural strength, psi | 7400 | 7200 | 5800 | 8600 | 9500 | 10000 | 9500 |
| Flexural modulus, psi | 357500 | 349500 | 362000 | 374000 | 387000 | 417000 | 363000 |
| % wt. gain, 24-hr water boil | 1.20 | 1.34 | 1.46 | 1.33 | 0.96 | 0.95 | 1.40 |
| 3-hr acetone boil | 0.00 | 0.02 | 0.13 | 0.09 | 0.05 | 0.11 | 0.18 |
| Compression strength, psi |  |  |  |  |  |  |  |
| at yield | 14900 | 14600 | 14700 | 15600 | 15200 | 14900 | 14500 |
| at failure | 27300 | 23000 | 22000 | 28300 | 24800 | 27400 | 27100 |
| % compression at yield | 12.7 | 13.5 | 12.7 | 13.2 | 12.2 | 12.6 | 12.2 |
| at failure | 28.9 | 28.1 | 25.8 | 31.2 | 28.5 | 30.4 | 30.7 |
| Modulus, psi | 199000 | 187700 | 194600 | 199600 | 202900 | 216000 | 200100 |

Properties of epoxy cures with imidazole lactone complexes were not substantially different from those of cures with IPMI alone. Generally, slightly lowered HDT values were noted (one higher HDT; with 1:1 molar beta-butyrolactone complex) and slightly greater susceptibility to moisture (boiling water) and chemical attack (boiling acetone). This was not found in all cases. Other physical properties were either improved or were unaffected.

EXAMPLE 4A

Reactivity of 1-isopropyl-2-phenyl imidazole - lactone complexes

|  | 6501-66A | 6713-21C | 6713-22B |
|---|---|---|---|
| Formulation - parts by weight | | | |
| Liquid epoxy resin (EEW 185-192) | 100 | 100 | 100 |
| 1-Isopropyl-2-phenylimidazole (IPPI) | 2 | — | — |
| IPPI-beta-Butyrolactone Complex (1:1 molar) | — | 3 | — |
| IPPI-gamma-Caprolactone Complex (1:1 molar) | — | — | 2 |
| Reactivity: | | | |
| Time to double viscosity @ 23° C., hrs. | ~45 | ~47 | ~51 |
| Gel time, mins. @ 80°C. | 80.8 | 80.7 | 120.4 |
| (100 g. mass) 120° C. | 33.9 | 19.0 | 32.4 |
| 150° C. | 15.2 | 9.5 | 26.9 |

EXAMPLE 4B

Epoxy Resins Cured with 1-isopropyl-2-phenyl imidazole - lactone complexes

|  | 6501-4C | 6713-21C | 6713-22B |
|---|---|---|---|
| Formulation - parts by weight | | | |
| Liquid epoxy resin (EEW 185-192) | 100 | 100 | 100 |
| 1-Isopropyl-2-phenylimidazole (IPPI) | 2 | — | — |
| IPPI-beta-Butyrolactone Complex (1:1 molar) | — | 3 | — |
| IPPI-gamma-Caprolactone Complex (1:1 molar) | — | — | 2 |
| Properties: Cured ⅛-inch Casting cured: 2 hrs 100° C., 4 hrs. 210° C. | | | |
| Shore D hardness, 0-10 sec. | 91-90 | 91-89 | 90-88 |
| HDT, °C., 284 psi | 261.6 | 223.5 | 200.7 |
| Izod impact strength, ft-lb/in | 0.14 | 0.04 | 0.05 |
| Tensile strength, psi | 2800 | 3400 | 4200 |
| Tensile modulus, psi | 471000 | 489000 | 437000 |
| Elongation at break, % | 0.6 | 0.9 | 1.2 |
| Flexural strength, psi | 5000 | 6350 | 8950 |
| Flexural modulus, psi | 387000 | 395000 | 372500 |
| % wt. gain, 24-hr water boil | 1.16 | 1.35 | 1.44 |
| 3-hr acetone boil | 0.01 | 0.20 | 0.00 |

Differences in reactivity of imidazole (IPPI) and IPPI lactone complexes were slight, in contrast to the results with IPMI lactone complexes. Physical properties were much like those obtained with IPMI complexes.

EXAMPLE 5

Reactivity of 1-methyl imidazole and 1-isopropyl imidazole - lactone complexes

|  | 6713-41A | 6713-40C | 6501-66A | 6713-31B |
|---|---|---|---|---|
| Formulation - parts by weight | | | | |
| Liquid epoxy resin (EEW 185-192) | 100 | 100 | 100 | 100 |
| 1-Methylimidazole (MI) | 1 | — | — | — |
| MI-epsilon-Caprolactone Complex (1:1 molar) | — | 3 | — | — |
| 1-Isopropyl-2-o-Tolylimidazole (IPTI) | — | — | 2 | — |
| IPTI-epsilon-Caprolactone Complex (1:1 molar) | — | — | — | 2 |
| Reactivity: | | | | |
| Time to double viscosity @ 23° C., hrs. | ~24 | ~22 | ~45 | ~46 |
| Gel time, mins. @ | | | | |
| 80° C. | 45.7 | 41.9 | 80.8 | 80.4 |
| 120° C. | 15.0 | 13.0 | 33.9 | 18.1 |
| 150° C. | 8.7 | 7.6 | 15.2 | 9.2 |
| Properties - Cured ⅛-inch Casting cured: 2 hrs 100° C., 4 hrs. 210°C. | 6713-41A | 6713-40C | 6501-46A | 6713-31B |
| Shore D hardness, 0-10 sec. | 90-88 | 90-88 | 90-89 | 90-89 |
| HDT, °C., 264 psi | 171.0 | 179.6 | 244.1 | 241.7 |
| Izod impact strength, ft-lb/in | 0.02 | 0.02 | 0.12 | 0.04 |
| Tensile strength, psi | 4500 | 4100 | 3800 | 3450 |
| Tensile modulus, psi | 399000 | 402000 | 380500 | 434000 |
| Elongation at break, % | 1.4 | 1.2 | 1.1 | 1.0 |
| Flexural strength, psi | 6700 | 6500 | 4400 | 7000 |
| Flexural modulus, psi | 383500 | 376000 | 372000 | 376000 |
| % wt. gain, | | | | |
| 24-hr water boil | 1.39 | 1.62 | 1.19 | 1.38 |
| 3-hr acetone boil | 0.20 | 0.22 | 0.04 | 0.08 |
| Compression strength, psi | | | | |
| at yield | 15000 | 14600 | — | — |
| at failure | 28800 | 22000 | — | — |
| % compression | | | | |
| at yield | 12.4 | 13.6 | — | — |
| at failure | 32.9 | 26.4 | — | — |
| Modulus, psi | 202000 | 192000 | — | — |

Results are like those of Example 3. Only small differences were found in reactivity of imidazoles versus imidazole lactone complexes. Physical properties of imidazole-lactone complexes were similar to those obtained with substituted imidazoles in Examples 3 and 4.

TABLE OF TEST METHODS

| Gel Time (minutes) | ASTM D-2471-71 |
|---|---|
| Shore D-Hardness 0-10 seconds | ASTM D-2240 |
| Elongation at Break (%) | ASTM D-638 |
| Heat Deflection Temperature (HDT) (°C., 264 psi/66 psi) | ASTM D-648 |
| Izod impact Strength (ft lbs/in) | ASTM D-256 |
| Tensile strength (psi) | ASTM D-638 |
| Tensile Modulus (psi) | ASTM D-638 |
| Flexural Strength (psi) | ASTM D-790 |
| Flexural Modulus (psi) | ASTM D-790 |
| Compression Strength at Yield; at Failure (psi) | ASTM D-695 |

TABLE OF TEST METHODS-continued

Modulus (psi)

While particular embodiments of the invention have been described, it will be understood, of course, that the invention is not limited thereto since many modifications may be made, and it is, therefore, contemplated to cover by the appended claims any such modification as fall within the true spirit and scope of the invention.

What is claimed is:

1. A composition comprising:
   (1) a polyglycidylether epoxy resin, and
   (2) an effective curing amount of an epoxy curing agent comprising a lactone-imidazole complex wherein the lactone-imidazole complex the lactone is selected from the group consisting of:
   beta-butyrolactone,
   gamma-butyrolactone,
   epsilon-caprolactone, and
   gamma-caprolactone;
   and the imidazole is
   1-isopropyl-2-methyl imidazole,
   and
   wherein the mole ratio of lactone-imidazole ranges from 1:1 to 2:1.

2. The composition of claim 1 wherein the mole ratio of lactone:imidazole is 1:1.

3. The composition of claim 1 wherein the mole ratio of lactone:imidazole is 2:1.

4. A method of forming an epoxy resin product comprising:
   mixing a lactone selected from the group consisting of:
   beta-butyrolactone, gamma-butyrolactone, epsilon-caprolactone, and gamma-caprolactone,
   with
   1-isopropyl-2-methyl imidazole,
   in a mole ratio of lactone:imidazole ranging from 1:1 to 2:1 to form a lactone-imidazole complex,
   admixing an effective curing amount of the lactone-imidazole complex with a polyglycidyl ether epoxy resin to form an admixture, and
   curing the admixture to yield an epoxy resin product.

5. The method of claim 4 wherein the mole ratio of lactone:imidazole is 1:1.

6. The method of claim 4 wherein the mole ratio of lactone:imidazole is 2:1.

* * * * *